US012224532B2

(12) United States Patent
Wang et al.

(10) Patent No.: US 12,224,532 B2
(45) Date of Patent: Feb. 11, 2025

(54) ELECTRICAL RECEPTACLE CONNECTOR

(71) Applicant: ADVANCED-CONNECTEK INC., New Taipei (TW)

(72) Inventors: Shu-Fen Wang, New Taipei (TW); Yu-Chai Yeh, New Taipei (TW); Yu-Bin Li, New Taipei (TW); Tao Wu, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 366 days.

(21) Appl. No.: 17/950,682

(22) Filed: Sep. 22, 2022

(65) Prior Publication Data

US 2023/0122513 A1 Apr. 20, 2023

(30) Foreign Application Priority Data

Oct. 14, 2021 (CN) .......................... 202111195217.9

(51) Int. Cl.
*H01R 13/6585* (2011.01)
*H01R 13/6471* (2011.01)

(52) U.S. Cl.
CPC ..... *H01R 13/6585* (2013.01); *H01R 13/6471* (2013.01)

(58) Field of Classification Search
CPC .............. H01R 13/646; H01R 13/6461; H01R 13/6471; H01R 13/658; H01R 13/6581; H01R 13/6585
USPC ...................................................... 439/607.05
See application file for complete search history.

(56) References Cited

U.S. PATENT DOCUMENTS

| | | | | | |
|---|---|---|---|---|---|
| 2016/0181733 | A1* | 6/2016 | Duan | H01R 13/6594 | 439/607.05 |
| 2016/0197442 | A1* | 7/2016 | Lin | H01R 13/6585 | 439/607.05 |
| 2016/0197443 | A1* | 7/2016 | Zhang | H01R 13/6585 | 439/607.05 |
| 2019/0148888 | A1* | 5/2019 | Huang | H01R 13/6585 | 439/607.05 |
| 2023/0094703 | A1* | 3/2023 | Zhao | H01R 13/405 | 439/607.05 |
| 2023/0122513 | A1* | 4/2023 | Wang | H01R 13/6585 | 439/607.05 |

* cited by examiner

*Primary Examiner* — Khiem M Nguyen
(74) *Attorney, Agent, or Firm* — MUNCY, GEISSLER, OLDS & LOWE, P.C.

(57) ABSTRACT

An electrical receptacle connector includes an insulated housing, a plurality of terminals, and a metallic plate. The terminals and the metallic plate are at the insulated housing. The terminals are held at the insulated housing and arranged into two rows. The metallic plate is at a tongue portion of the insulated housing and between the terminals which are arranged into two rows. The metallic plate has a main body and a plurality of extension portions. Each of the extension portions extends outwardly from the main body and corresponds to a protrusion of a corresponding one of the terminals. A distance between each of the protrusions and a corresponding one of the extension portions is less than a distance between each of the contact portions and the corresponding one of the extension portions. A retaining spacing is between the protrusions of the terminals and the extension portions of the metallic plate.

10 Claims, 9 Drawing Sheets

ELECTRICAL RECEPTACLE CONNECTOR

CROSS-REFERENCE TO RELATED APPLICATION

This non-provisional application claims priority under 35 U.S.C. § 119(a) to Patent Application No. 202111195217.9 filed in China, P.R.C. on Oct. 14, 2021, the entire contents of which are hereby incorporated by reference.

FIELD OF THE INVENTION

The instant disclosure relates to an electrical connector, and more particular to an electrical receptacle connector.

BACKGROUND

Generally, Universal Serial Bus (USB) is a serial bus standard to the PC architecture with a focus on computer interface, consumer and productivity applications. The existing Universal Serial Bus (USB) interconnects have the attributes of plug-and-play and ease of use by end users. Now, as technology innovation marches forward, new kinds of devices, media formats and large inexpensive storage are converging. They require significantly more bus bandwidth to maintain the interactive experience that users have come to expect. In addition, the demand of a higher performance between the PC and the sophisticated peripheral is increasing. The transmission rate of USB 2.0 is insufficient. As a consequence, faster serial bus interfaces such as USB 3.0, are developed, which may provide a higher transmission rate so as to satisfy the need of a variety devices.

SUMMARY OF THE INVENTION

The appearance, the structure, the contact ways of terminals, the number of terminals, the pitches between terminals (the distances between the terminals), and the pin assignment of terminals of a USB type-C electrical connector known to the inventor(s) are totally different from another prior USB electrical connector known to the inventor(s). For a USB type-C electrical receptacle connector known to the inventor, the thickness of the terminals of the USB type-C electrical receptacle connector compared with another prior USB electrical receptacle connector is more thinner, and thus the current withstand capability of the terminals cannot be increased easily. However, if the thickness of the terminals is increased, the distance between the terminals and the metallic plate is too short, resulting in the risk of the connector will have poor withstand voltage performance and cause dangers of short circuit.

According to one or some embodiments, an electrical receptacle connector is provided. The electrical receptacle connector comprises an insulated housing, a plurality of terminals, and a metallic plate. The insulated housing comprises a base portion and a tongue portion. One end of the tongue portion extends outwardly from one side of the base portion. The terminals are held at the insulated housing and arranged into two rows. Each of the terminals comprises a contact portion and a body portion. The body portions are held at the base portion, and the contact portions are exposed from two faces of the tongue portion. Each of the terminals has a protrusion, and each of the protrusions is at an end portion of a corresponding one of the contact portions and extends into the tongue portion. Each of the contact portions has a first thickness, and each of the protrusions has a second thickness. The metallic plate is at the tongue portion and between the terminals which are arranged into two rows. The metallic plate has a main body and a plurality of extension portions. Each of the extension portions extends outwardly from the main body and corresponds to the protrusion of a corresponding one of the terminals. Each of the protrusions has a third thickness, the main body has a fourth thickness, and the third thickness is less than the fourth thickness. A distance between each of the protrusions and a corresponding one of the extension portions is less than a distance between each of the contact portions and the corresponding one of the extension portions, and a retaining spacing is between each of the protrusions and the corresponding one of the extension portions.

In some embodiments, the terminals comprise a plurality of high-speed signal terminals, a plurality of low-speed signal terminals, a plurality of power terminals, and a plurality of ground terminals. The ground terminals are at two outermost sides of the power terminals, and the low-speed signal terminals are between the power terminals. In at least one of the two rows of the terminals, each of the high-speed signal terminals is between an adjacent one of the power terminals and an adjacent one of the ground terminals. Each of the extension portions extends outwardly from the main body and corresponds to the protrusion of a corresponding one of the high-speed signal terminals.

In some embodiments, the metallic plate has a plurality of margin portions, each of the margin portions is between a corresponding one of the extension portions and the main body and corresponds to a corresponding one of the contact portions, and a surface of each of the extension portions and a surface of the main body are at different planes.

In some embodiments, a thickness between the two faces of the tongue portion is 0.7 mm, the first thickness is in a range between 0.1 mm and 0.12 mm, the first thickness is greater than the second thickness, and the retaining spacing is in a range between 0.1 mm and 0.2 mm.

In some embodiments, the retaining spacing is in a range between 0.12 mm and 0.18 mm.

In some embodiments, an electrical receptacle connector is provided. The electrical receptacle connector comprises an insulated housing, a plurality of terminals, and a metallic plate. The insulated housing comprises a base portion and a tongue portion. One end of the tongue portion extends outwardly from one side of the base portion. The terminals are held at the insulated housing and arranged into two rows. Each of the terminals comprises a contact portion and a body portion. The body portions are held at the base portion, and the contact portions are exposed from two faces of the tongue portion. Each of the terminals has a protrusion, and each of the protrusions is at an end portion of a corresponding one of the contact portions and extends into the tongue portion. Each of the contact portions has a first thickness, and each of the protrusions has a second thickness. The metallic plate is at the tongue portion and between the terminals which are arranged into two rows. The metallic plate has a main body and a plurality of extension portions. Each of the extension portions extends outwardly from the main body and corresponds to the protrusion of a corresponding one of the terminals. Each of the protrusions has a third thickness, the main body has a fourth thickness, and the third thickness is equal to the fourth thickness. A distance between each of the protrusions and a corresponding one of the extension portions is less than a distance between each of the contact portions and the corresponding one of the extension portions, and a retaining spacing is between each of the protrusions and the corresponding one of the extension portions.

In some embodiments, a surface of each of the extension portions and a surface of the main body are at the same plane.

Based on the above, according to one or some embodiments of the instant disclosure, a plurality of terminals and a metallic plate between the terminals are held at a tongue portion with a predetermined thickness. Therefore, a retaining spacing can be kept between the protrusions of the terminals and the extension portions of the metallic plate. Therefore, the current withstand capability of the terminals can be increased, and the issue that the connector will have poor withstand voltage performance and encounter short-circuited condition owing that the distance between the terminals and the metallic plate is too short can be prevented. In some embodiments, the extension portions of the metallic plate correspond to a portion between the protrusions of the high-speed signal terminals to prevent high-frequency signal interferences.

Detailed descriptions of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
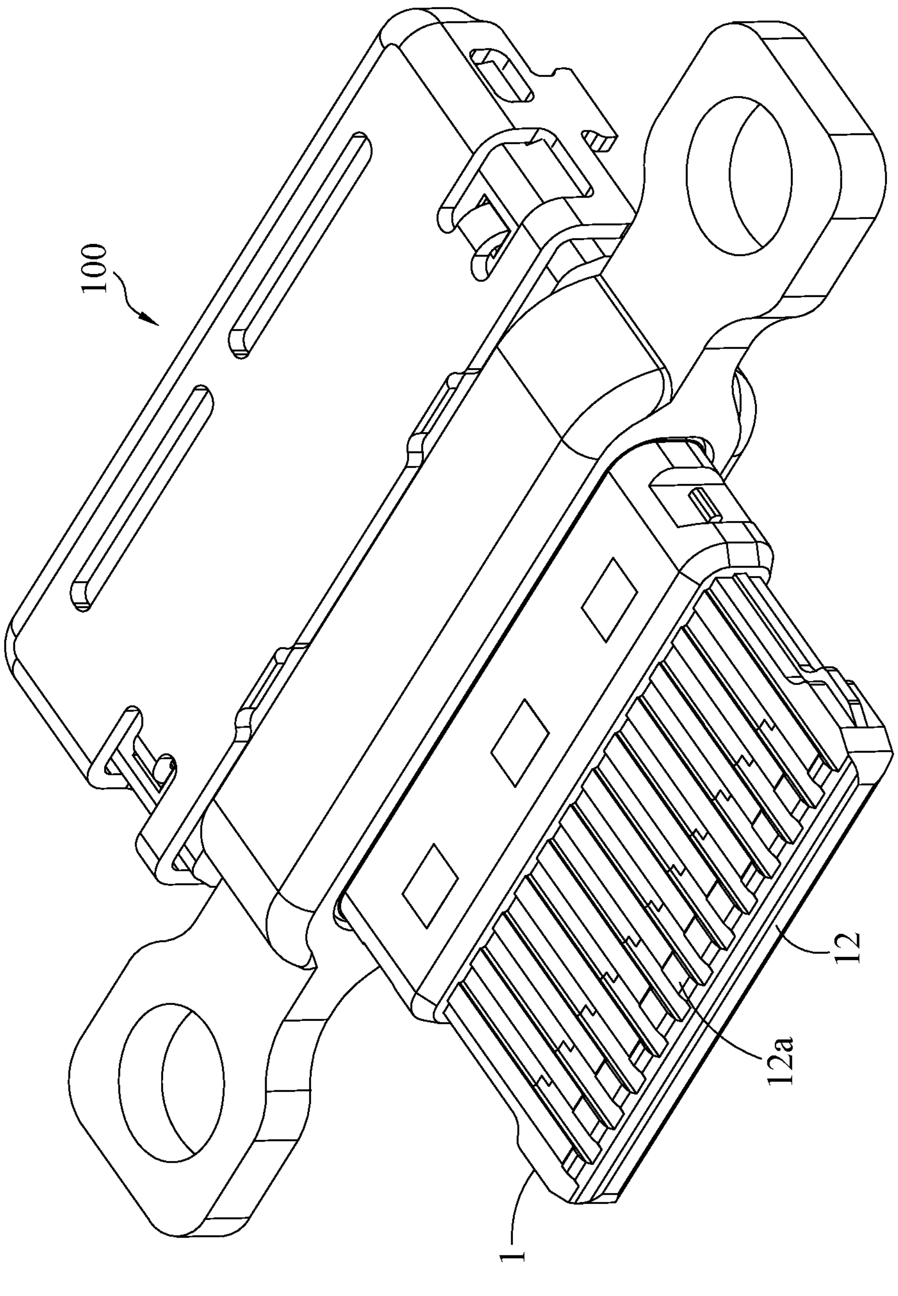
FIG. 1 illustrates a perspective view of an electrical receptacle connector according to some embodiments of the instant disclosure.
Figure 2:
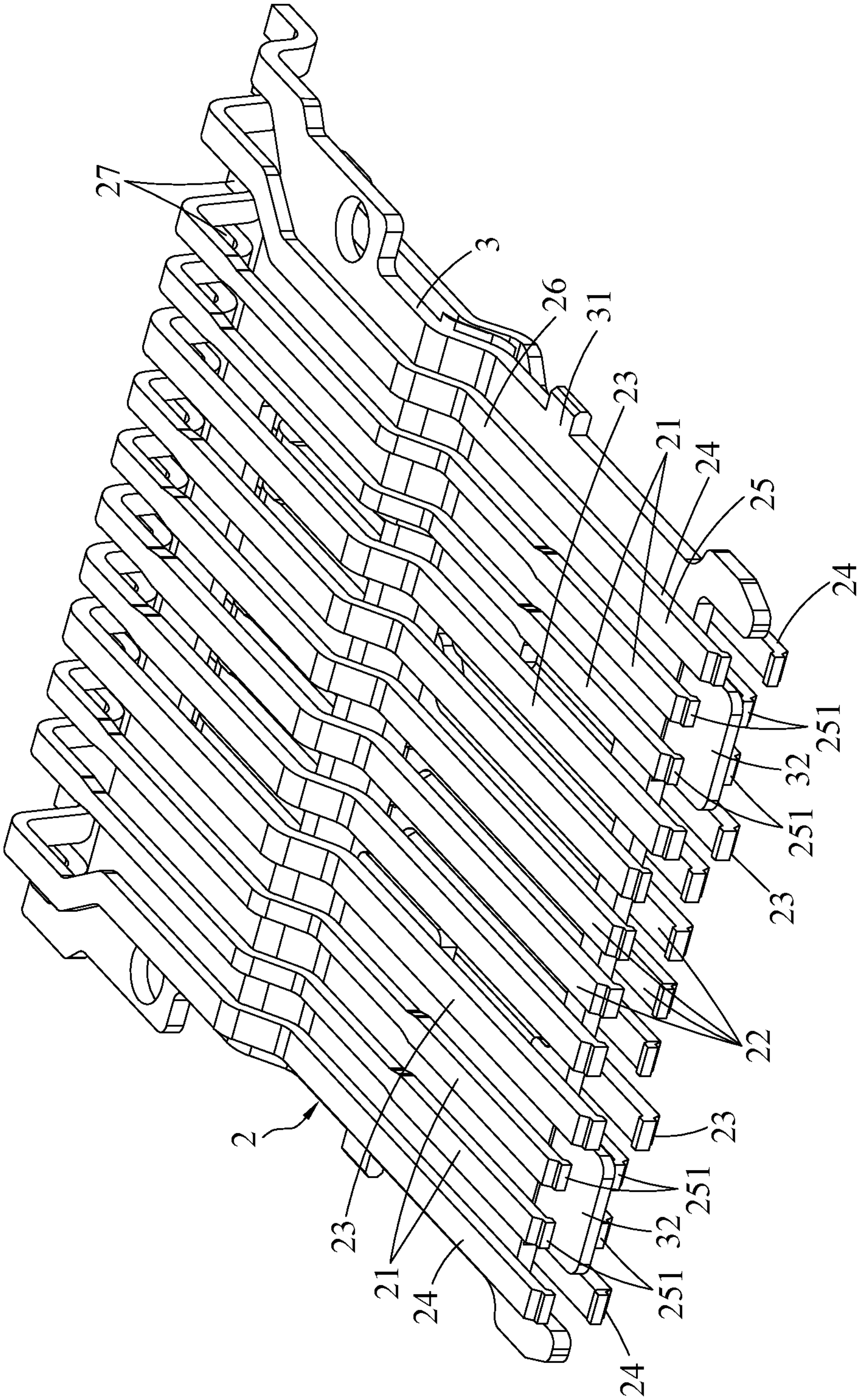
FIG. 2 illustrates a perspective view of the terminals and the metallic plate of the electrical receptacle connector according to some embodiments of the instant disclosure.

Please refer to FIG. 1 and FIG. 2. FIG. 1 illustrates a perspective view of an electrical receptacle connector 100 according to some embodiments of the instant disclosure. FIG. 2 illustrates a perspective view of the terminals 2 and the metallic plate 3 of the electrical receptacle connector 100 according to some embodiments of the instant disclosure. In some embodiments, the electrical receptacle connector 100 is in accordance with the specification of USB type-C connection interfaces, and the electrical receptacle connector 100 adopts a connection interface with high-frequency signals, but embodiments are not limited thereto. In some embodiments, the electrical receptacle connector 100 adopts a connection interface without high-frequency signals. In this embodiment, the electrical receptacle connector 100 comprises an insulated housing 1, a plurality of terminal 2, and a metallic plate 3.

The insulated housing 1 comprises a base portion 11 and a tongue portion 12, and one end of the tongue portion 12 extends outwardly from one side of the base portion 11.

Figure 6:
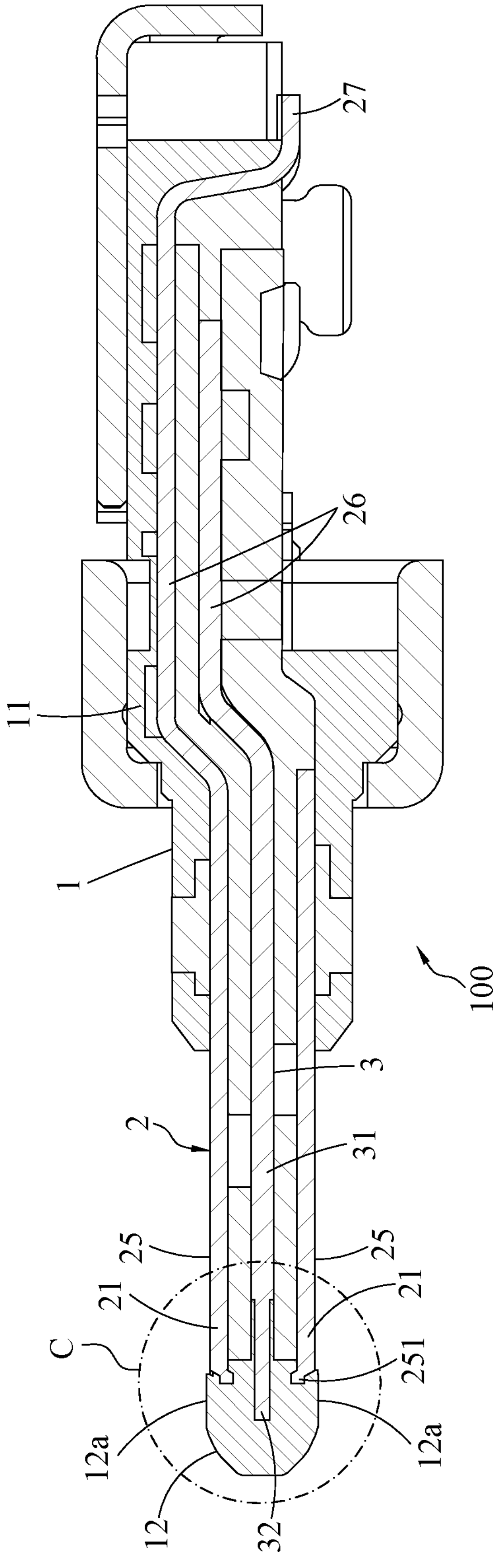
FIG. 6 illustrates a schematic cross-sectional view along the line A-A shown in FIG. 5.
Figure 7:
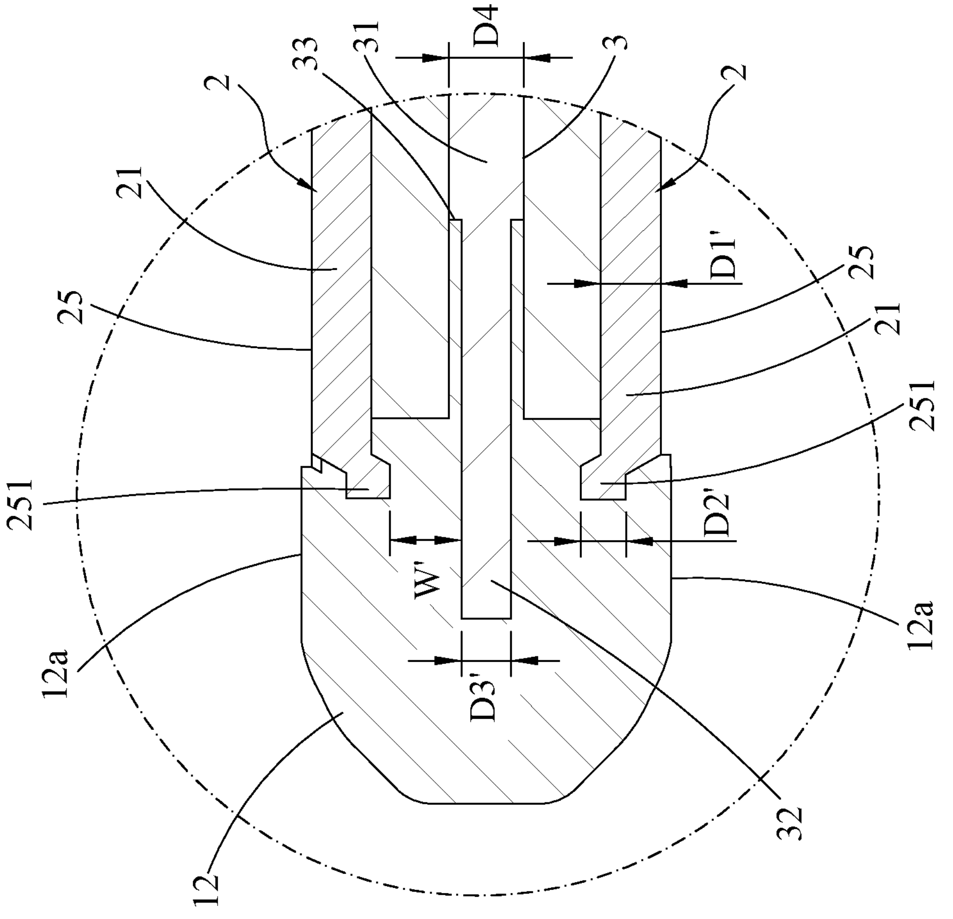
FIG. 7 illustrates an enlarged partial view of the portion C enclosed in the FIG. 6.
Figure 9:
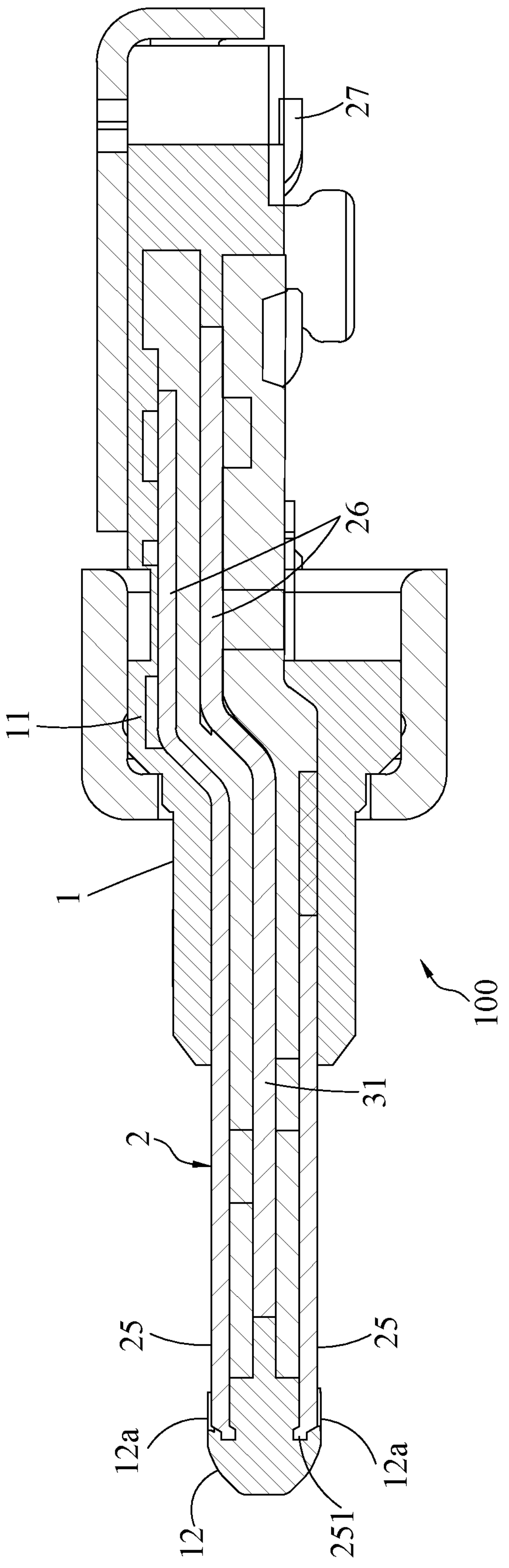
FIG. 9 illustrates a schematic cross-sectional view along the line B-B shown in FIG. 5.

The terminals 2 are arranged in two rows, and the two rows are respectively arranged on the insulated housing 1 (as shown in FIG. 6 and FIG. 9). The terminals 2 comprise a plurality of contact portions 25 and a plurality of body portions 26. The body portions 26 are held at the base portion 11, and the contact portions 25 are exposed from two faces **12*a* of the tongue portion 12. Each of the terminals 2 has a protrusion 251, and each of the protrusions 251 is at an end portion of a corresponding one of the contact portions 25 and extends into the tongue portion 12. Each of the contact portions 25 has a first thickness D1' (as shown in FIG. 7), and each of the protrusions 251** has a second thickness D2'.

Figure 3:
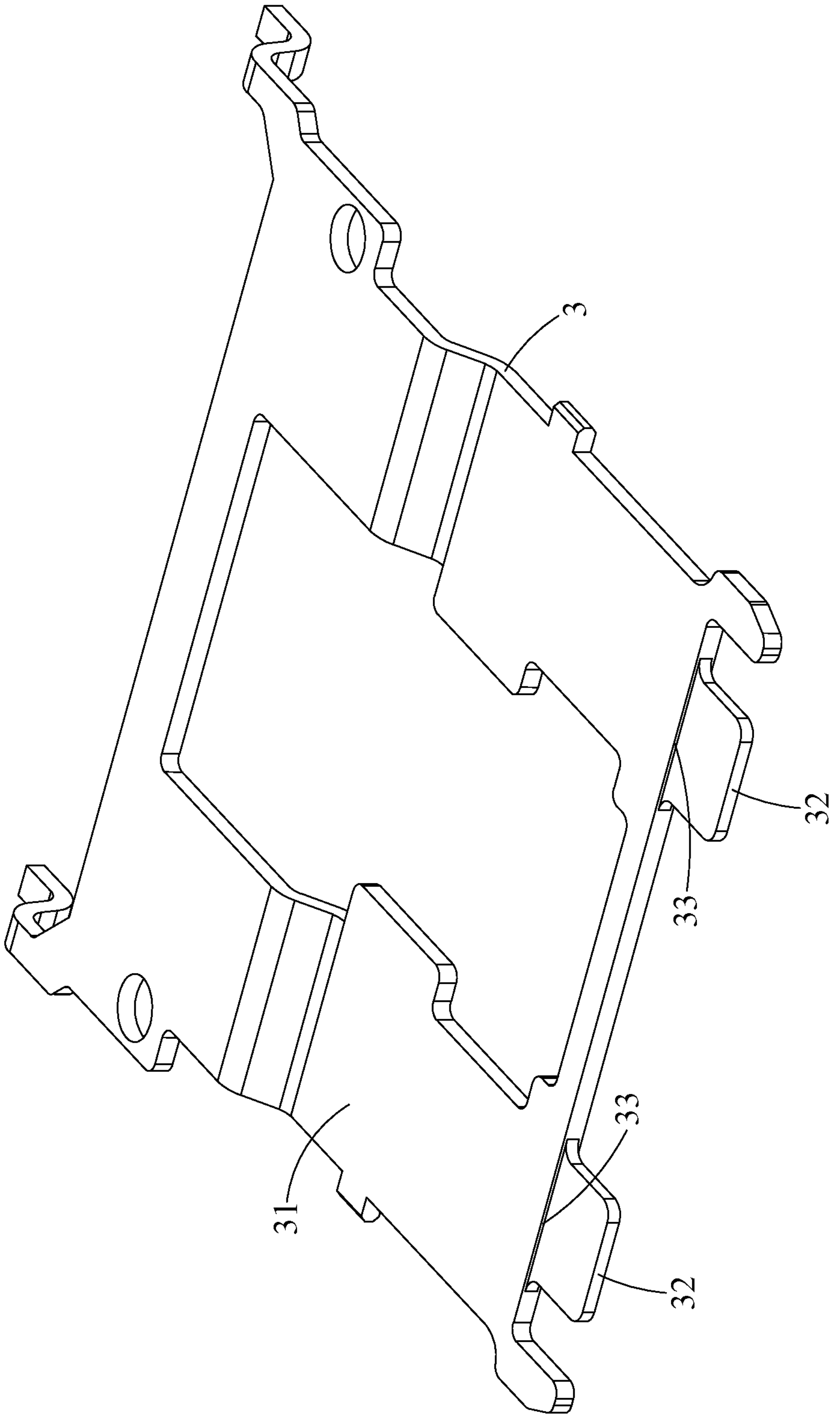
FIG. 3 illustrates a perspective view of the metallic plate of the electrical receptacle connector according to some embodiments of the instant disclosure.
Figure 4:
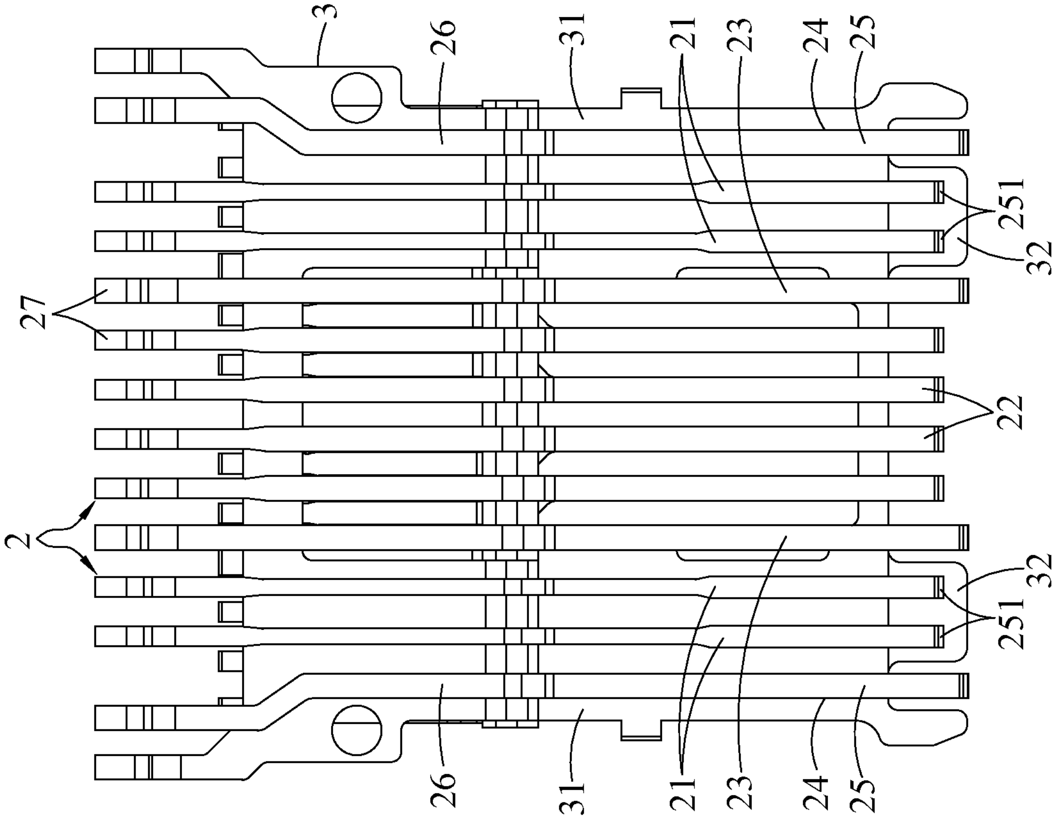
FIG. 4 illustrates a top view of the terminals and the metallic plate of the electrical receptacle connector according to some embodiments of the instant disclosure.

Please refer to FIG. 3 and FIG. 4. FIG. 3 illustrates a perspective view of the metallic plate 3 of the electrical receptacle connector 100 according to some embodiments of the instant disclosure. FIG. 4 illustrates a top view of the terminals 2 and the metallic plate 3 of the electrical receptacle connector 100 according to some embodiments of the instant disclosure. In some embodiments, the metallic plate 3 is at the tongue portion 12 and between the terminals 2 which are arranged into two rows (as shown in FIG. 6 and FIG. 7). The metallic plate 3 has a main body 31 and a plurality of extension portions 32. Each of the extension portions 32 extends outwardly from the main body 31 and corresponds to the protrusion 251 of a corresponding one of the terminals 2. Each of the extension portions 32 has a third thickness D3' (as shown in FIG. 7), the main body 31 has a fourth thickness D4, and the third thickness D3' is less than the fourth thickness D4. A distance between each of the protrusions 251 and a corresponding one of the extension portions 32 is less than a distance between each of the contact portions 25 and the corresponding one of the extension portions 32, and a retaining spacing W' is between each of the protrusions 251 and the corresponding one of the extension portions 32.

Please refer to FIG. 1 and FIG. 2. In some embodiments, the terminals 2 comprise a plurality of high-speed signal terminals 21, a plurality of low-speed signal terminals 22, a plurality of power terminals 23, and a plurality of ground terminals 24. The ground terminals 24 are at two outermost sides of the power terminals 23 (as shown in FIG. 4). The low-speed signal terminals 22 are between the power terminals 23. Each of the high-speed signal terminals 21 is between an adjacent one of the power terminals 23 and an adjacent one of the ground terminals 24. Each of the extension portions 32 extends outwardly from the main body 31 and corresponds to the protrusion 251 of a corresponding one of the high-speed signal terminals 21. In some embodiments, a thickness between the two faces **12*a* of the tongue portion 12 is 0.7 mm (as shown in FIG. 7**).

Under the condition that the tongue portion 12 has a predetermined thickness (for example, the thickness of the tongue portion 12 is 0.7 mm), a plurality of terminals 2 and a metallic plate 3 are held at the tongue portion 12 with the predetermined thickness. Therefore, the retaining spacing W' can be kept between the protrusions 251 of the terminals 2 and the extension portions 32 of the metallic plate 3 (as shown in FIG. 7, for example, the retaining spacing W' is in a range between 0.12 mm and 0.18 mm). Therefore, the current withstand capability of the terminals 2 can be increased, and the issue that the connector will have poor withstand voltage performance and encounter short-circuited condition owing that the distance between the terminals 2 and the metallic plate 3 is too short can be prevented.

In some embodiments, the protrusions 251 of the terminals 2 extend into the tongue portion 12 and positioned in the tongue portion 12. Therefore, the contact portions 25 of the terminals 2 can be prevented from tilting upwardly and detaching from the tongue portion 12.

In some embodiments, the terminals 2 are formed by blanking techniques. The first thickness D1' of the contact portion 25 of each of the terminals 2 is in a range between 0.1 mm and 0.12 mm, and the retaining spacing W' is in a range between 0.1 mm and 0.2 mm. In some embodiments, the retaining spacing W' is in a range between 0.12 mm and 0.18 mm. In some embodiments, the retaining spacing W' is 0.15 mm. In the case that the terminals 2 are adopted with a thicker first thickness D1', the current withstand capability of the terminals 2 can be increased. In the case that the contact portions 25 of the terminals 2 are adopted with a thicker first thickness D1', the protrusions 251 are processed to extend and bend toward the extension portions 32. Therefore, the distance between the protrusions 251 and the extension portions 32 can be reduced. However, if the retaining spacing W' between the protrusions 251 and the extension portions 32 is too short (as shown in FIG. 7, the retaining spacing W' is reduced), the issues that the connector will have poor withstand voltage performance and encounter short-circuited condition may occur. In some embodiments, the high-speed signal terminals 21, the low-speed signal terminals 22, the power terminals 23, and the ground terminals 24 may be adopted with the thicker first thickness D1'. In some embodiments, the thickness of the power terminal 23 is greater than the thickness of the high-speed signal terminal 21, greater than the thickness of the low-speed signal terminal 22, and greater than the thickness of the ground terminal 24. In some embodiments, the first thickness D1' is greater than the second thickness D2'.

Please refer to FIG. 7. In some embodiments, by processing the extension portions 32 to be flattened (for example, using a flattening process), the third thickness D3' of the extension portion 32 of the metallic plate 3 is less than the fourth thickness D4 of the main body 31 of the metallic plate 3, and the extension portions 32 of the metallic plate 3 correspond to a portion between the protrusions 251 of the high-speed signal terminals 21 to prevent high-frequency signal interferences.

Please refer to FIG. 7. In some embodiments, the metallic plate 3 has a plurality of margin portions 33, each of the margin portions 33 is between a corresponding one of the extension portions 32 and the main body 31 and corresponds to a corresponding one of the contact portions 25, and a surface of each of the extension portions 32 and a surface of the main body 31 are at different planes. Therefore, the surface of each of the extension portions 32 and the surface of the main body 31 form a stepped structure.

Figure 8:
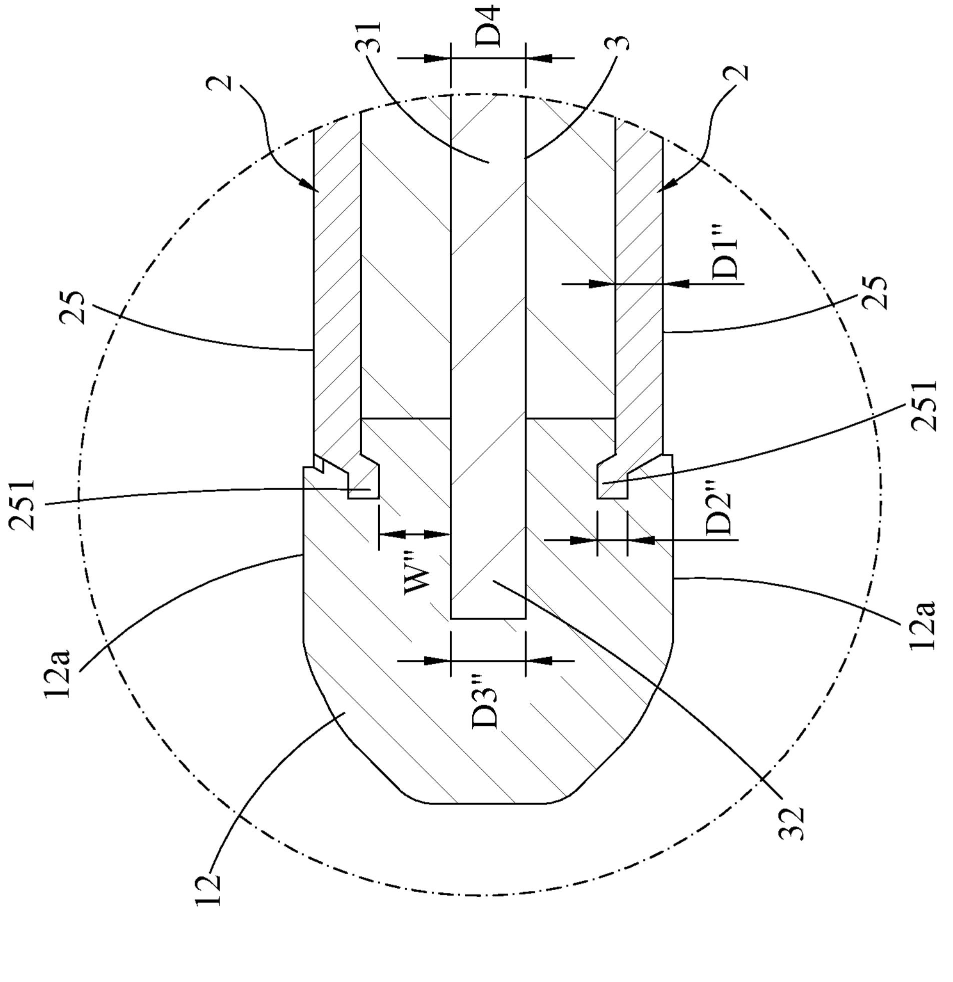
FIG. 8 illustrates an enlarged partial view of an electrical receptacle connector according to another embodiment of the instant disclosure from a viewing angle same as FIG. 7.

Please refer to FIG. 8. FIG. 8 illustrates an enlarged partial view of an electrical receptacle connector 100 according to another embodiment of the instant disclosure from a viewing angle same as FIG. 7. In some embodiments, the contact portions 25 of the terminals 2 are adopted with a thinner thickness by processing the terminals 2 with the flattening process. Each of the contact portions 25 has a first thickness D1", and the first thickness D1" shown in FIG. 8 is less than the first thickness D1' shown in FIG. 7. The extension portions 32 are not processed to be flattened. The surface of each of the extension portions 32 and the surface of the main body 31 are at the same plane. The retaining spacing W" is kept between the protrusions 251 of the terminals 2 and the extension portions 32 of the metallic plate 3 (for example, the retaining spacing W" is in a range between 0.12 mm and 0.18 mm). Therefore, the current withstand capability of the terminals 2 can be increased, and the issue that the connector will have poor withstand voltage performance and encounter short-circuited condition owing that the distance between the terminals 2 and the metallic plate 3 is too short can be prevented. In some embodiments, the third thickness D3" of the extension portion 32 of the metallic plate 3 is equal to the fourth thickness D4 of the main body 31 of the metallic plate 3, the first thickness D1" is greater than the second thickness D2", and the second thickness D2" shown in FIG. 8 is less than the second thickness D2' shown in FIG. 7.

In some embodiments, the electrical receptacle connector 100 comprises a metallic shell. The metallic shell is a hollow shell and has a receiving cavity, and the insulated housing 1 is in the receiving cavity.

In some embodiments, in the two rows of the terminals 2, the contact portions 25 of the high-speed signal terminals 21 are shielded by the metallic plate 3 (as shown in FIG. 2, at the upper and lower rows of the terminals 2, the front ends of the contact portions 25 of two high-speed signal terminals 21 at the right portion and the front ends of the contact portions 25 of two high-speed signal terminals 21 at the left portion correspond to the protrusions 32). In this embodiment, owing to the shielding of the metallic plate 3, the contact portions 25 of the high-speed signal terminals 21 of the two rows of the terminals 2 do not face each other.

Figure 5:
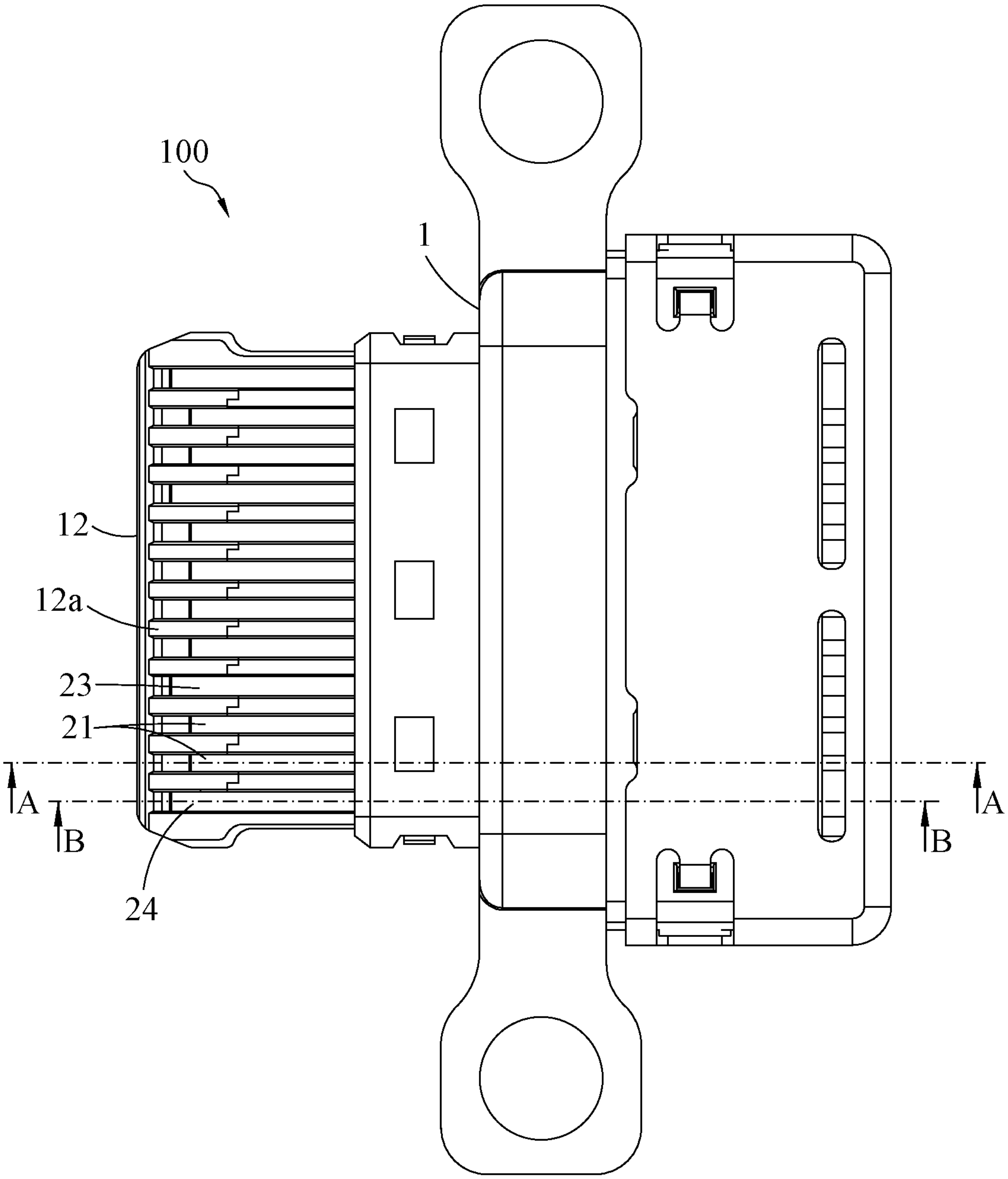
FIG. 5 illustrates a top view of the electrical receptacle connector according to some embodiments of the instant disclosure.

Please refer to FIG. 5. In some embodiments, taking the front side surface of the tongue portion 12 as a reference surface, the front end of the contact portion 25 of each of the power terminals 23 and the ground terminals 24 in the two rows is nearer to the front side surface, and the front end of the contact portion 25 of each of the high-speed signal terminals 21 and the low-speed signal terminals 22 in the two rows is farer from the front side surface. The front end of the contact portion 25 of each of the terminals 2 is covered by the tongue portion 12 (as shown in FIG. 5 and FIG. 7), and an upper surface or a lower surface of each of the contact portions 25 is exposed from the two faces 12*a* of the tongue portion 12.

Please refer to FIG. 2 and FIG. 4. FIG. 4 illustrates a perspective view of the terminal module of the electrical receptacle connector 100 according to some embodiments of the instant disclosure. In some embodiments, the high-speed signal terminals 21 are divided into two groups respectively at two outermost sides of the low-speed signal terminals 22. The ground terminals 24 are at two outermost sides of the power terminals 23. The low-speed signal terminals 22 are between the power terminals 23. In at least one of the two rows at the two faces 12*a* of the tongue portion 12, each of the two groups of the high-speed signal terminals 21 is between an adjacent one of the power terminals 23 and an adjacent one of the ground terminals 24.

Please refer to FIG. 2 to FIG. 4. In some embodiments, the terminals 2 at one of the two faces 12*a* of the tongue portion 12 has four high-speed signal terminals 21 and two low-speed signal terminals 22, and the terminals 2 at the other face 12*a* of the tongue portion 12 has four high-speed signal terminals 21 and two low-speed signal terminals 22. Moreover, in some embodiments, the terminals 2 at one of the two faces 12*a* of the tongue portion 12 has two power terminals 23 and two ground terminals 24, and the terminals 2 at the other face 12*a* of the tongue portion 22 has two power terminals 23 and two ground terminals 24.

Please refer to FIG. 2 to FIG. 4. The two sides of the metallic plate 3 protrude from two sides of the tongue portion 12 so as to be buckled by hooks of an electrical plug connector. Therefore, when an electrical plug connector is inserted into the electrical receptacle connector 100, owing to the two protruding sides of the metallic plate 3, the buckling pieces at the two sides of the electrical plug connector can be prevented from wearing against the two sides of the tongue portion 12 to cause the wearing and damaging of the tongue portion 12.

Please refer to FIG. 2 and FIG. 3. In some embodiments, the terminals 2 comprise body portions 26 and tail portions 27. The body portions 26 are held at the base portion 11. Each of the contact portions 25 extends from one of two ends of a corresponding one of the body portions 26 and at one or the other of the two faces 12*a* of the tongue portion 12. Each of the tail portions 27 extends from the other end of a corresponding one of the body portions 26 and protrudes from a rear portion of the base portion 11. The tail portions 27 are aligned horizontally to form flat legs (SMT (surface mount technology) legs which can be soldered or mounted on the surface of a circuit board using surface mount technology).

Please refer to FIG. 2 to FIG. 4. In some embodiments, the pin arrangement of the terminals 2 at the upper row of the tongue portion 12 shown in FIG. 2 is, from left to right, a ground terminal 24 (Gnd), a first pair of high-speed signal terminals 21 (TX1+−, differential signal terminals for high-speed signal transmission), a power terminals 23 (Power/VBUS), a function detection terminal (CC1, a terminal for inserting orientation detection of the connector and for cable recognition), a pair of low-speed signal terminals 22 (D+−, differential signal terminals for low-speed signal transmission), a reserved terminal (SBU1, which may be defined to provide other purposes), another power terminal 23 (Power/VBUS), a second pair of high-speed signal terminals 21 (RX2+−, differential signal terminals for high-speed signal transmission), and another ground terminal 24 (Gnd). In this embodiment, twelve terminals 2 are provided at the upper row of the tongue portion 12 for transmitting USB 3.0 signals.

Please refer to FIG. 2 to FIG. 4. In some embodiments, the pin arrangement of the terminals 2 at the lower row of the tongue portion 12 shown in FIG. 2 is, from right to left, a ground terminal 24 (Gnd), a first pair of high-speed signal terminals 21 (TX2+−, differential signal terminals for high-speed signal transmission), a power terminals 23 (Power/VBUS), a function detection terminal (CC2, a terminal for inserting orientation detection of the connector and for cable recognition), a pair of low-speed signal terminals 22 (D+−, differential signal terminals for low-speed signal transmission), a reserved terminal (SBU2, which may be defined to provide other purposes), another power terminal 23 (Power/VBUS), a second pair of high-speed signal terminals 21 (RX1+−, differential signal terminals for high-speed signal transmission), and another ground terminal 24 (Gnd). In this embodiment, twelve terminals 2 are provided at the lower row of the tongue portion 12 for transmitting USB 3.0 signals.

In some embodiments, the metallic plate 3 is at the tongue portion 12 to increase the structural strength of the tongue portion 12. In some embodiments, the metallic plate 3 has several pins extending from the rear portion of the metallic plate 3. Therefore, when signals are transmitted between the terminals of the electrical plug connector and the terminals 2 of the electrical receptacle connector 100, the terminals 2 of the electrical receptacle connector 100 can be isolated from each other by the metallic plate 3 to reduce the crosstalk signal interferences upon signal transmission. Moreover, the pins are provided for connecting to a circuit board for conduction and grounding.

Based on the above, according to one or some embodiments of the instant disclosure, a plurality of terminals and a metallic plate between the terminals are held at a tongue portion with a predetermined thickness. Therefore, a retaining spacing can be kept between the protrusions of the terminals and the extension portions of the metallic plate. Therefore, the current withstand capability of the terminals can be increased, and the issue that the connector will have poor withstand voltage performance and encounter short-circuited condition owing that the distance between the terminals and the metallic plate is too short can be prevented. In some embodiments, the extension portions of the metallic plate correspond to a portion between the protrusions of the high-speed signal terminals to prevent high-frequency signal interferences.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electrical receptacle connector, comprising:

an insulated housing comprising a base portion and tongue portion, wherein one end of the tongue portion extends outwardly from one side of the base portion;

a plurality of terminals held at the insulated housing and arranged into two rows, wherein each of the terminals comprises a contact portion and a body portion; the body portions are held at the base portion, and the contact portions are exposed from two faces of the tongue portion; each of the terminals has a protrusion, each of the protrusions is at an end portion of a corresponding one of the contact portions and extends into the tongue portion; each of the contact portions has a first thickness, and each of the protrusions has a second thickness; and a metallic plate, wherein the metallic plate is at the tongue portion and between the terminals which are arranged into two rows; the metallic plate has a main body and a plurality of extension portions, each of the extension portions extends outwardly from the main body and corresponds to the protrusion of a corresponding one of the terminals; each of the extension portions has a third thickness, the main body has a fourth thickness, and the third thickness is less than the fourth thickness; a distance between each of the protrusions and a corresponding one of the extension portions is less than a distance between each of the contact portions and the corresponding one of the extension portions, and a retaining spacing is between each of the protrusions and the corresponding one of the extension portions.

2. The electrical receptacle connector according to claim 1, wherein the terminals comprise a plurality of high-speed signal terminals, a plurality of low-speed signal terminals, a plurality of power terminals, and a plurality of ground terminals; the ground terminals are at two outermost sides of the power terminals, and the low-speed signal terminals are between the power terminals; in at least one of the two rows of the terminals, each of the high-speed signal terminals is between an adjacent one of the power terminals and an adjacent one of the ground terminals; each of the extension portions extends outwardly from the main body and corresponds to the protrusion of a corresponding one of the high-speed signal terminals.

3. The electrical receptacle connector according to claim 2, wherein the metallic plate has a plurality of margin portions, each of the margin portions is between a corresponding one of the extension portions and the main body and corresponds to a corresponding one of the contact portions, and a surface of each of the extension portions and a surface of the main body are at different planes.

4. The electrical receptacle connector according to claim 2, wherein a thickness between the two faces of the tongue portion is 0.7 mm, the first thickness is in a range between 0.1 mm and 0.12 mm, the first thickness is greater than the second thickness, and the retaining spacing is in a range between 0.1 mm and 0.2 mm.

5. The electrical receptacle connector according to claim 2, wherein the retaining spacing is in a range between 0.12 mm and 0.18 mm.

6. An electrical receptacle connector, comprising:

an insulated housing comprising a base portion and tongue portion, wherein one end of the tongue portion extends outwardly from one side of the base portion;

a plurality of terminals held at the insulated housing and arranged into two rows, wherein each of the terminals comprises a contact portion and a body portion; the body portions are held at the base portion, and the contact portions are exposed from two faces of the tongue portion; each of the terminals has a protrusion, each of the protrusions is at an end portion of a corresponding one of the contact portions and extends into the tongue portion; each of the contact portions has a first thickness, and each of the protrusions has a second thickness; and a metallic plate, wherein the metallic plate is at the tongue portion and between the terminals which are arranged into two rows; the metallic plate has a main body and a plurality of extension portions, each of the extension portions extends outwardly from the main body and corresponds to the protrusion of a corresponding one of the terminals;

each of the extension portions has a third thickness, the main body has a fourth thickness, and the third thickness is equal to the fourth thickness; a distance between each of the protrusions and a corresponding one of the extension portions is less than a distance between each of the contact portions and the corresponding one of the extension portions, and a retaining spacing is between each of the protrusions and the corresponding one of the extension portions.

7. The electrical receptacle connector according to claim 6, wherein a surface of each of the extension portions and a surface of the main body are at the same plane.

8. The electrical receptacle connector according to claim 6, wherein a thickness between the two faces of the tongue portion is 0.7 mm.

9. The electrical receptacle connector according to claim 6, the first thickness is in a range between 0.1 mm and 0.12 mm, the first thickness is greater than the second thickness, and the retaining spacing is in a range between 0.1 mm and 0.2 mm.

10. The electrical receptacle connector according to claim 6, wherein the retaining spacing is in a range between 0.12 mm and 0.18 mm.

* * * * *